United States Patent
Sengottaiyan et al.

(10) Patent No.: US 8,369,304 B2
(45) Date of Patent: Feb. 5, 2013

(54) METHODS TO REDUCE POWER FOR ASYNCHRONOUS INTERNET MESSAGE PROTOCOLS

(75) Inventors: Ravindranathan Sengottaiyan, Garland, TX (US); Sudhindra P. Herle, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 12/655,878

(22) Filed: Jan. 8, 2010

(65) Prior Publication Data

US 2011/0170464 A1     Jul. 14, 2011

(51) Int. Cl.
*H04L 12/56*     (2006.01)
*H04J 1/16*       (2006.01)

(52) U.S. Cl. ........ 370/346; 370/311; 370/412; 370/429; 370/449

(58) Field of Classification Search ............. 370/311, 370/346, 412, 429, 449
See application file for complete search history.

(56) References Cited

U.S. PATENT DOCUMENTS

| | | | | |
|---|---|---|---|---|
| 6,363,267 | B1 * | 3/2002 | Lindskog et al. | 455/574 |
| 8,036,690 | B1 * | 10/2011 | Delker et al. | 455/512 |
| 2008/0120423 | A1 * | 5/2008 | Hall et al. | 709/229 |

* cited by examiner

*Primary Examiner* — John Pezzlo

(57) ABSTRACT

A method for reducing power consumption in a mobile station is provided. The method includes holding data associated with a first polling message until a first scheduled RF wake-up of the mobile station. The method also includes sending the data associated with the first polling message at substantially the same time as the first scheduled RF wake-up of the mobile station. The method further includes holding a second polling message until a second scheduled RF wake-up of the mobile station. The scheduled RF wake-ups of the mobile station are determined according to a schedule established by a service provider of the wireless communication network. In certain embodiments, the polling messages are associated with an ActiveSync® Ping command.

20 Claims, 5 Drawing Sheets

METHODS TO REDUCE POWER FOR ASYNCHRONOUS INTERNET MESSAGE PROTOCOLS

TECHNICAL FIELD OF THE INVENTION

The present application relates generally to wireless communications and, more specifically, to reducing power for asynchronous internet message protocols in wireless mobile stations.

BACKGROUND OF THE INVENTION

Many internet message protocols such as Internet Message Access Protocol (IMAP), ActiveSync® by Microsoft Corporation, and Instant Messaging—Presence (IM) were originally designed for use with wired networks. The protocols require a TCP connection between the message server and the client to perform any activity such as reception of a new email or a presence status update of a buddy in a social network environment. To maintain the TCP connection, the client must keep the IP address alive. IP-based wired networks are tolerant of large timeouts. Thus, in wired networks, it is not difficult for Internet message protocols to maintain TCP connections for a long period of time.

Most internet message retrieval protocols use a polling based scheme to detect arrival of new messages. The polling interval is configurable and is set as part of an application-level message. For example, ActiveSync® uses a custom HTTP method called "PING" and sets a timeout value as part of the method. All of these application-level messages ride on top of the TCP layer. Thus, the messages require the underlying TCP to be kept alive for the duration of the timeout value. Typical values for an application polling timeout period is between 15 and 60 minutes.

Due to the transient nature of wireless networks, there are many possibilities for the loss of a TCP connection at any point in time. TCP connections may be torn down due to handoff, signal loss, etc. In order to resume message retrieval polling, a new TCP connection must be established. Establishing the new TCP resets the polling interval. Wireless devices supporting these protocols will re-establish a TCP connection whenever it is lost. In the re-establishment procedure, the IP address of the device may change. In many cases, the polling method must be established and re-established several times per hour. This activity has an adverse impact on battery life.

SUMMARY OF THE INVENTION

A mobile station configured to reduce power consumption is provided. The mobile station includes a battery and a controller operatively coupled to the battery. The controller is configured to hold data associated with a first polling message until a first scheduled RF wake-up of the mobile station. The controller is also configured to send the data associated with the first polling message at substantially the same time as the first scheduled RF wake-up of the mobile station. The controller is further configured to hold a second polling message until a second scheduled RF wake-up of the mobile station.

A method for reducing power consumption in a mobile station is provided. The method includes holding data associated with a first polling message until a first scheduled RF wake-up of the mobile station. The method also includes sending the data associated with the first polling message at substantially the same time as the first scheduled RF wake-up of the mobile station. The method further includes holding a second polling message until a second scheduled RF wake-up of the mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Due to the transient nature of wireless networks, TCP connections may be torn down due to handoff, signal loss, etc. In order to resume the message retrieval polling method, a new TCP connection must be established. Establishing the new TCP resets the polling interval. In many cases, the polling method must be established and re-established several times per hour. Each repetition of this activity requires additional power. This has an adverse impact on battery life.

For example, for a mobile user who roams often, mobile service is characterized by numerous handoffs. As a result, TCP tear downs occur frequently, thus requiring frequent re-establishment of the connection. Each re-establishment of the TCP connection requires power from the battery. Ultimately, this results in less time between battery charges. Even mobile users who don't often roam may experience an accelerated battery drain due to messaging. For example, the network may sense a "handset idle" condition and tear down the TCP connection to conserve network resources. When a message is sent or received, the TCP connection must be restored, thus reducing time between battery charges.

The more a mobile user uses email, the more significant the battery drain becomes. For a mobile user that frequently sends or receives email, a TCP connection must be re-established after every timeout in order to transmit the email. These frequent reconnections have an adverse effect on battery life between charges.

Figure 1:
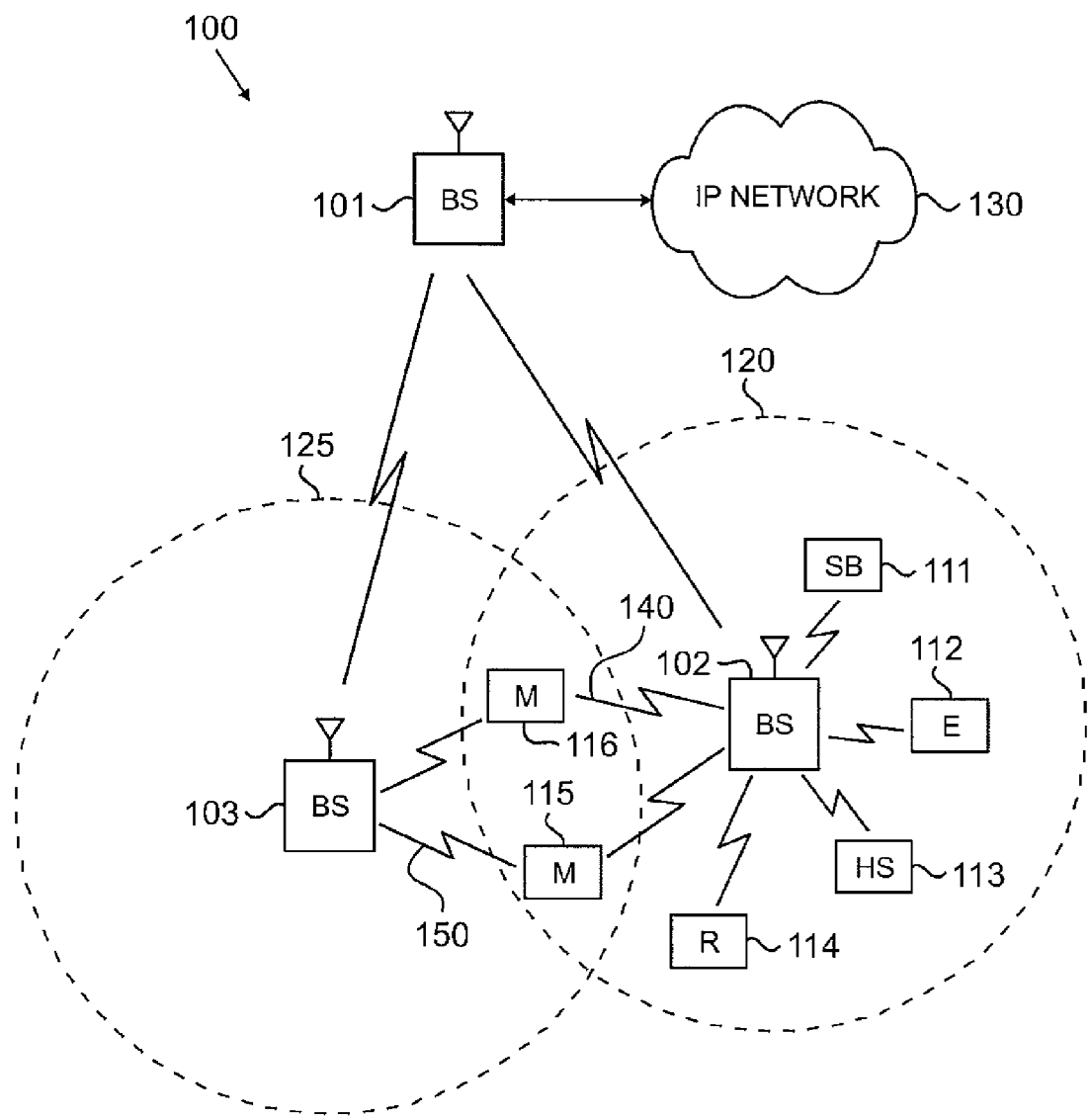
FIG. 1 illustrates an exemplary wireless network 100 according to one embodiment of the present disclosure.

FIG. 1 illustrates an exemplary wireless network 100 according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Figure 2:
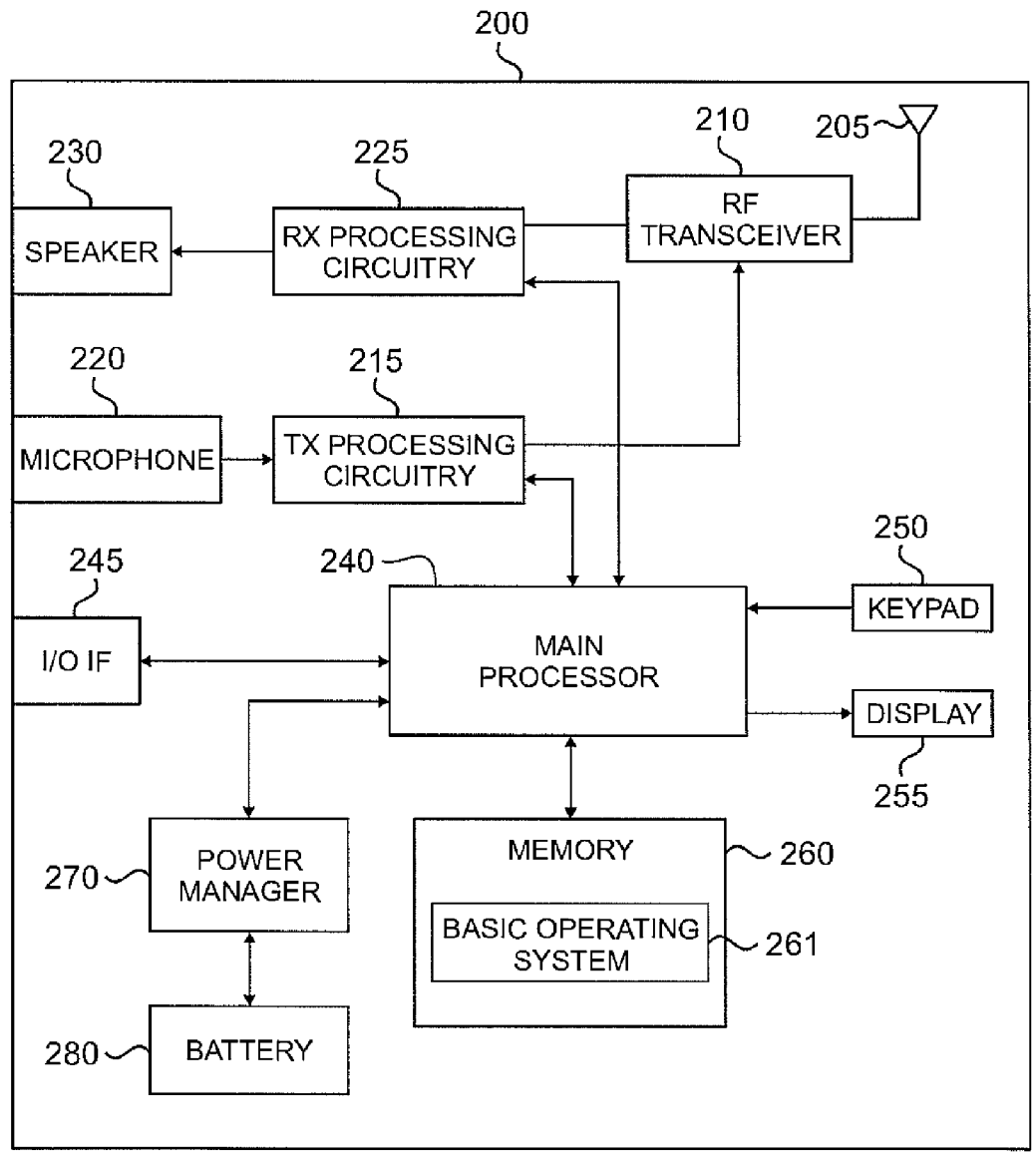
FIG. 2 illustrates a wireless mobile station 200 according to embodiments of the present disclosure.

FIG. 2 illustrates a wireless mobile station 200 according to embodiments of the present disclosure. In certain embodiments, wireless mobile station 200 may represent any of the subscriber stations 111-116 shown in FIG. 1. The embodiment of wireless mobile station (MS) 200 illustrated in FIG. 2 is for illustration only. Other embodiments of wireless mobile station 200 could be used without departing from the scope of this disclosure.

Wireless mobile station 200 comprises antenna 205, radio frequency (RF) transceiver 210, transmit (TX) processing circuitry 215, microphone 220, and receive (RX) processing circuitry 225. Mobile station 200 also comprises speaker 230, main processor 240, input/output (I/O) interface (IF) 245, keypad 250, display 255, memory 260, power manager 270, and battery 280.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. Memory 260 can be any computer readable medium. For example, memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of mobile station 200. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to power manager 270, which is further coupled to battery 280. Main processor 240 and/or 270 power manager may include software, hardware, and/or firmware capable of controlling and reducing power usage and extending the time between charges of battery 280. In certain embodiments, power manager 270 may be separate from main processor 240. In other embodiments, power manager 270 may be integrated in, or otherwise a part of, main processor 240.

Main processor 240 is also coupled to keypad 250 and display unit 255. The operator of mobile station 200 uses keypad 250 to enter data into mobile station 200. Display 255 may be a liquid crystal or light emitting diode (LED) display capable of rendering text and/or graphics from web sites. Alternate embodiments may use other types of displays.

Figure 3:
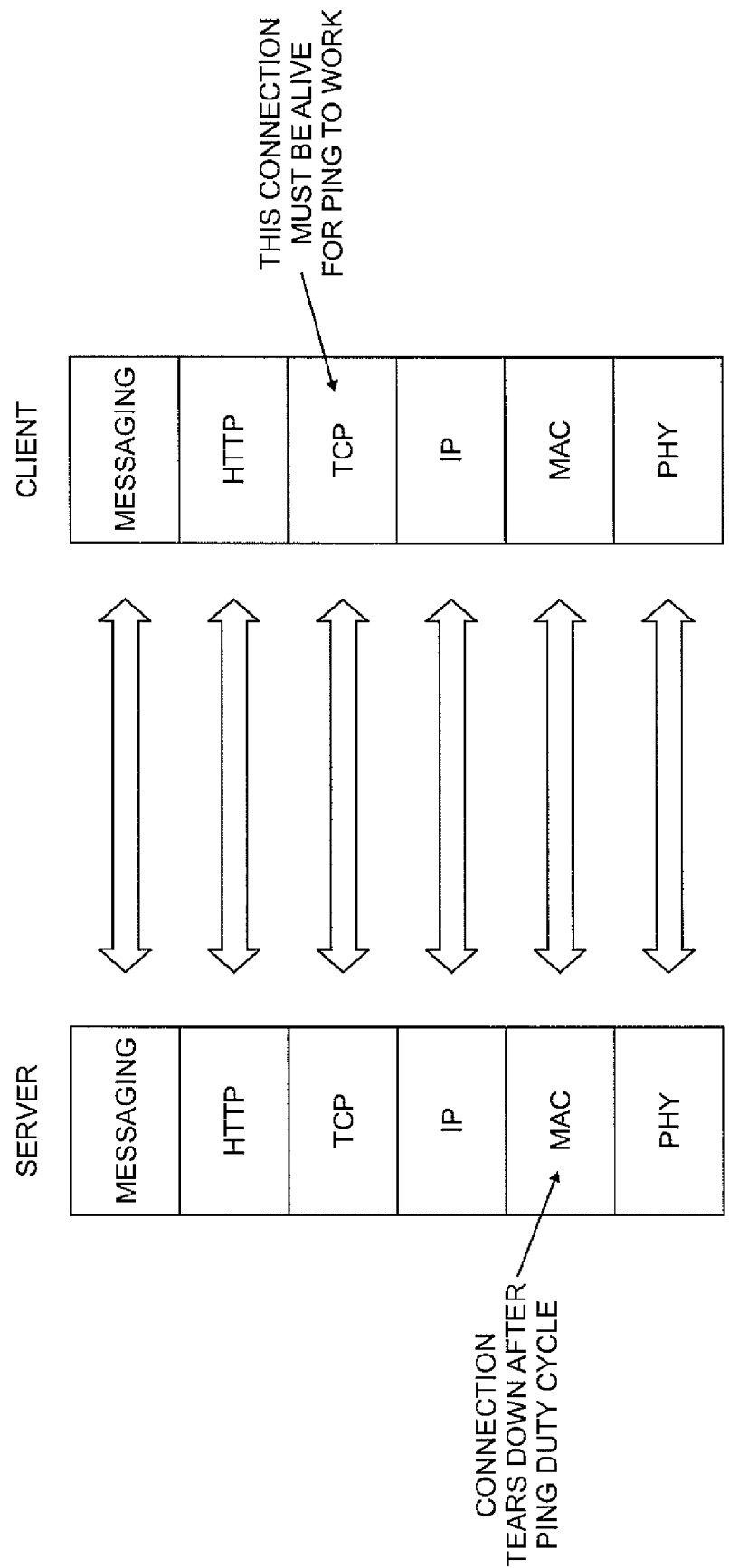
FIG. 3 depicts typical network stacks for a client and a server having email or messaging protocols.

FIG. 3 depicts typical network stacks for a client (e.g., a mobile station) and a server (e.g., a base station) having email or messaging protocols. In wireless networks, maintenance of the MAC and PHY connections is supported mainly by the service provider network. Most messaging protocols (including IMAP, ActiveSync®, and IM) are configured to send a Ping command every x minutes. For example, ActiveSync® recommends using a Ping duty cycle having a length of anywhere from 8 minutes to 30 minutes. The IMAP protocol specifies that the duration of each IDLE command be 29 minutes. As shown in FIG. 1, the TCP connection must be active for the Ping to succeed. If the TCP connection has been torn down, and the loss is detected by the wireless device at any time, it will try to re-establish the TCP connection.

The cost to maintain the connection for a longer time is increased power usage and more rapid battery depletion. As seen in Table 1 below, the length of the Ping duration has a direct impact on increased power consumption (and thus shorter battery life between charges).

TABLE 1

Ping Duration and Battery Life

| Carrier and Duration | | Idle Current (mA) | Duty Cycle (Secs) | Battery Life (Hours) | Average current (mA) |
|---|---|---|---|---|---|
| Carrier #1 | 1 Hr Ping Idle | 2.5 | 19 | 289 | 3.46 |
| | 30 Min Ping Idle | | | 228 | 3.5 |
| | 15 Min Ping Idle | | | 160 | 7.2 |
| Carrier #2 | 1 Hr Ping Idle | 3.6 | 60 | 151 | 6.6 |
| | 30 Min Ping Idle | | | 104 | 9.6 |
| | 15 Min Ping Idle | | | 65 | 18.1 |

Also, a wireless device is dependent on the RF wake-up duty cycle established by the service provider network, as the PHY layer connection is under the control of the service provider network. This means that the wireless device must be active during each RF wake-up duty cycle, even if the cycle does not correspond to the Ping duty cycle. Each additional active period for the wireless device requires battery power and shortens the time between battery charges. The RF wake-up duty cycle varies from service provider to service provider, as this is a network configuration parameter, as seen in Table 1.

Furthermore, depending on its Radio Resource Connection (RRC) state, the wireless device may consume different amount of power. Table 2 illustrates relative power consumption for a wireless device in different RRC states. For example, in a Cell_DCH state, a wireless device may operate at 100% relative power. However, in an idle state, the same wireless device may operate at only 1% relative power. Thus, each time that the wireless device operates in a Cell_DCH state, it is consuming substantially more of the battery's power than it does while idle.

TABLE 2

RRC State and Relative Power Consumption

| RRC state | Relative Power Consumption Rate | Measured (mA) | Estimated (mA) |
|---|---|---|---|
| Cell_DCH | 100% | 180 | 200-400 |
| Idle | 1% | 2.5 | 2-4 |

Figure 4:
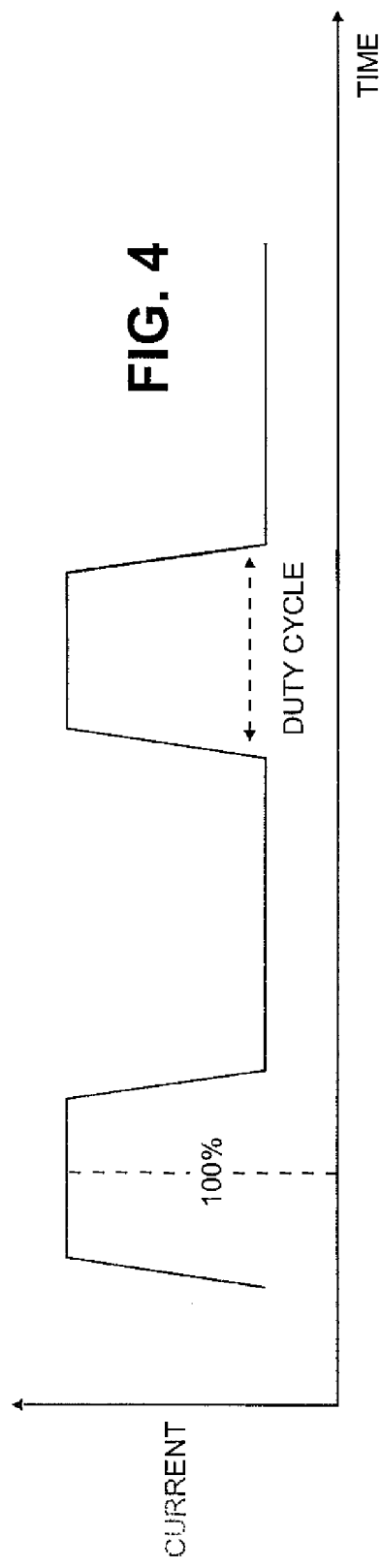
FIG. 4 depicts a graph illustrating current used by a typical wireless device over time.

FIG. 4 depicts a graph illustrating current used by a typical wireless device over time. As shown in the graph, the current required by the wireless device increases to 100% of relative current during each Ping (polling) or RF wake-up duty cycle. By integrating the current used by the wireless device over a period of time, a total amount of consumed battery power can be determined. If each duty cycle is extended to a longer period, or if more duty cycles occur during a period of time, then more of the battery's power is consumed.

Different activities may trigger an RF wake-up. For example, during an idle period, a wireless handset may trigger a wake-up for a Location Area Update (LAU) or Routing Area Update (RAU) procedure. Also, a user request to make a voice call or any data application usage may trigger a wireless handset to wake up. Since each RF wake-up cycle of the wireless device uses battery power, it is clear that, by reducing the number of RF wake-ups in a given period of time, it is possible to reduce the power consumed by the wireless device during that time period.

Several methods are provided below that reduce the power consumption of a wireless device.

Battery-aware algorithm: Based on the present battery strength, polling (e.g., Ping) is disabled when a preset threshold is reached (e.g., 20% battery life remains). Polling may resume when the battery strength improves (e.g., the battery is charged or replaced) or the handset is plugged into an external power source.

Handset-aware algorithm: Handset activity is monitored over a period of time. If it is determined that the handset is idle for a long duration of time, then polling is disabled. To ensure that the user experience is not compromised by an extended idle period, the polling may be scheduled every two hours, or at another predetermined interval.

Network-aware algorithm: The state of the network and the roaming status of the handset are monitored. If it is determined that the handset is frequently roaming, then polling is disabled. Polling may be resumed when the roaming activity is reduced or a configurable time interval has passed.

RF-aware algorithm: Since much of the power consumption of a wireless device happens due to RF transmission and RF reception, it is advantageous to synchronize the application polling messages and TCP keep-alive messages to coincide with scheduled RF sleep/wake-up cycles. Thus, instead of sending Ping commands whenever necessary, if the Ping commands can be adjusted to align with the RF wake-up, it is possible to reduce the overall number of wake-ups. Also, by having a wireless device wait longer for a poll response, the RF transmitter may be turned off earlier by the handset moving to a dormant state.

Figure 5:
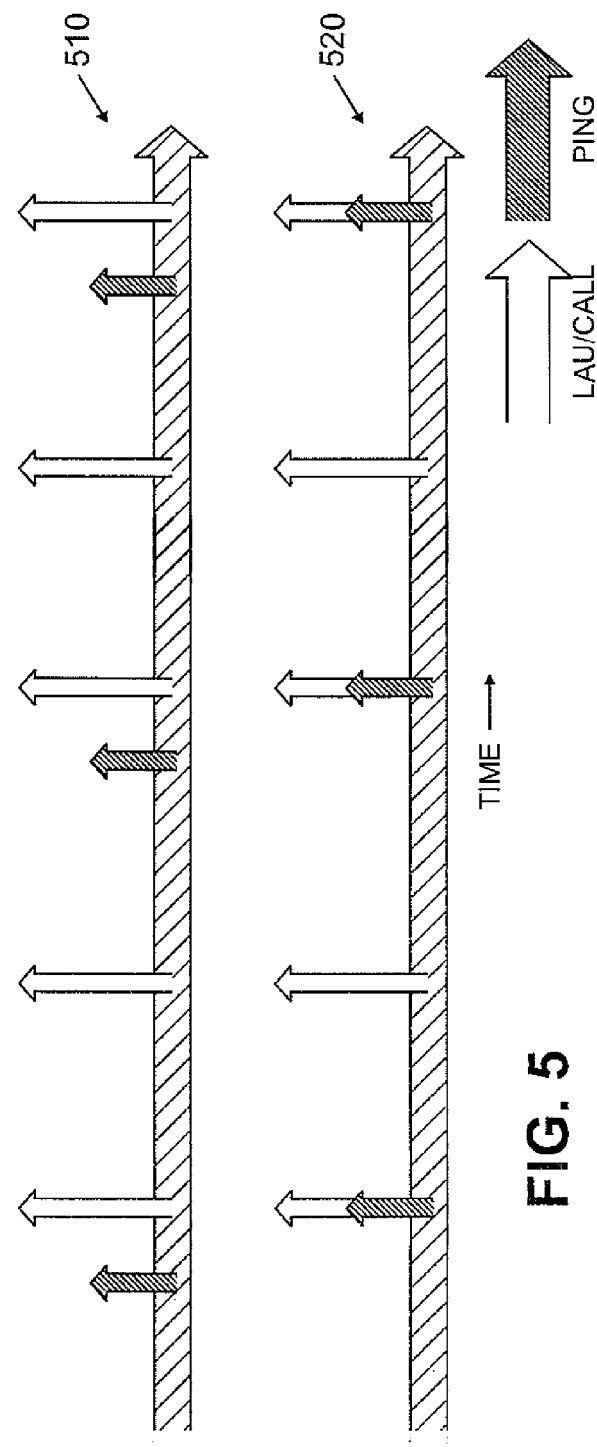
FIG. 5 depicts timelines of RF wake-ups by a wireless device, according to one embodiment of the present disclosure.

FIG. 5 depicts timelines of RF wake-ups by a wireless device, according to one embodiment of the present disclosure. In timeline 510, a wireless device has not synchronized its Ping commands (depicted as dark arrows) with the scheduled RF wake-ups (depicted as white arrows). Thus, each Ping requires an additional RF wake-up. In contrast, timeline 520 depicts a wireless device where the Ping commands have been aligned with the scheduled RF wake-ups. Since each Ping corresponds to a scheduled RF wake-up, no additional RF wake-ups are needed to perform the Ping commands, thus substantially reducing power usage over time.

The same concept can be applied to any voice and data calls processed by the wireless device. LAU timing could be up to one hour or more. This power-saving algorithm may be applied to every RF wake-up for transmission related to data calls along with each LAU.

Figure 6:
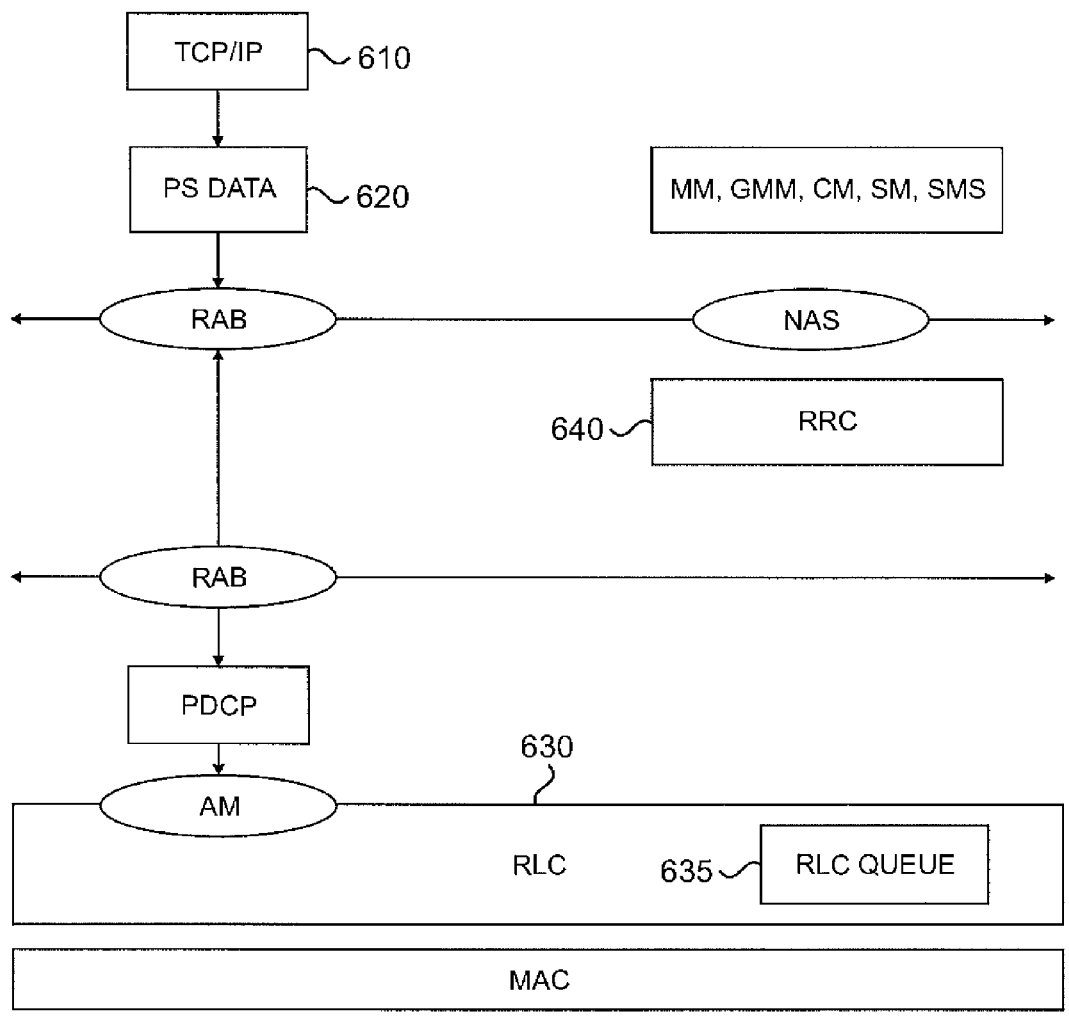
FIG. 6 depicts the architecture of a wireless device, according to one embodiment of the present disclosure.

FIG. 6 depicts the architecture of a wireless device, according to one embodiment of the present disclosure. Device 600 includes IP layer 610, PS data layer 620, radio link control (RLC) layer 630, and RRC layer 640. The connected lines in FIG. 6 represent the implementation flow. In the RF-aware algorithm described above, when HTTP data or application data needs to be sent out from the wireless device, the data will be given up to IP layer 610, as is typical in normal processing. Then, from IP layer 610, the data will be given to RLC layer 630.

If the data includes Ping data, then the Ping data is marked as data that can be sent when the Packet Switched (PS) connection is available. When the PS connection is created, this data shall also be sent. It is noted that the PS connection need not be created immediately. Because it could be a very long time before the PS connection is established, a wait threshold may be determined, and a timer (T1) may be started to count toward the threshold. When timer T1 reaches the threshold, a TCP connection may be established, and the Ping data may be sent. Timer T1 provides a method for allowing data to be sent outside of the RF wake-up schedule, if the RF wake-up schedule would require too long of a delay. In certain embodiments, RLC layer 630 may implement a separate queue 635 for the data that can be delayed.

The transmitter of the wireless device may be turned off during each idle period. A second timer (T2) may be started for this purpose. It is recommended that the threshold value for timer T2 be five (5) seconds or more.

Different procedures of the RF-aware algorithm will now be described with respect to the architecture shown in FIG. 6.

Procedure 1: When Data is Available

1. The trigger for this procedure is when Ping data is available at PS layer 620.

2. PS layer 620 sends out a notification that Ping data is available.

3. If RRC layer 640 is in a connected state, the Ping data is scheduled to be sent immediately.

4. If RRC layer 640 is not in a connected state, the Ping data is queued in RLC queue 635, and timer T1 is started.

Procedure 2: When RRC is in Connected State

1. The trigger for this procedure is when RRC layer 640 moves to a connected state (e.g., the CELL_DCH state).

2. RLC layer 630 is informed that RRC layer 640 is in AM mode. The connection manager is informed that the packet switched data is ready for data transfer.

3. The actual data that needs to be sent must be scheduled first.

4. If RLC queue 635 is not empty, then data is taken from RLC queue 635 and scheduled to be sent. If timer T1 is running, then timer T1 is stopped, and timer T2 is started. Procedure 4 is triggered when timer T2 expires.

5. If RLC queue 635 is empty, then the procedure ends.

Procedure 3: Timer T1 Expires

1. The trigger for this procedure is when timer T1 expires.

2. Upon expiration of timer T1, RRC layer 640 moves to a connected state.

3. When RRC layer 640 enters the connected state, Procedure 2 is triggered.

Procedure 4: Timer T2 Expires

1. The trigger for this procedure is when timer T2 expires.

2. Upon expiration of timer T2, the RF transmitter (e.g., RF transceiver 210) may be turned off.

Procedure 5: Resetting Timer T2

1. The trigger for this procedure is any time that data is transmitted.

2. If there is any data transmission, then timer T2 is reset.

Use of the RF-aware algorithm and/or one or more of the other power saving algorithms may have a significant effect on the standby time of a wireless device. For example, in one test, the standby time for an ActiveSync®-enabled handset was less than twenty-four (24) hours when none of the battery-saving algorithms was used. However, by applying the RF-aware algorithm, the standby time for the same handset was increased to approximately seven (7) days.

These algorithms may be applied to a variety of wireless handsets, including WCDMA and CDMA EVDO handsets. It is expected that LTE-based handsets may also be supported.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station configured to reduce power consumption, the mobile station comprising:
   a battery; and
   a controller operatively coupled to the battery, the controller configured to:
      hold data associated with a first polling message until a first scheduled RF wake-up of the mobile station;

send the data associated with the first polling message at substantially the same time as the first scheduled RF wake-up of the mobile station;

hold data associated with a second polling message until a second scheduled RF wake-up of the mobile station;

start a timer; and send data associated with a third polling message before a third scheduled RF wake-up when the timer reaches a predetermined value.

2. The mobile station of claim 1, wherein the data associated with the first and second polling messages is held in a queue in a radio link control (RLC) layer.

3. The mobile station of claim 1, the controller further configured to establish a TCP connection to a base station in the wireless communication network at substantially the same time as the first scheduled RF wake-up of the mobile station.

4. The mobile station of claim 1, wherein the first and second scheduled RF wake-ups of the mobile station are determined according to a schedule established by a service provider of the wireless communication network.

5. The mobile station of claim 1, the controller further configured to turn off a transceiver of the mobile station during an idle period between the first and second scheduled RF wake-ups of the mobile station.

6. The mobile station of claim 1, wherein the first and second polling messages are associated with an ActiveSync® Ping command.

7. The mobile station of claim 4, wherein the data associated with the first and second polling messages is held in a queue in a radio link control (RLC) layer.

8. The mobile station of claim 3, wherein the controller is configured to establish the TCP connection by placing the mobile station in a Cell_DCH state.

9. For use in a mobile station in a wireless communication network, a controller configured to reduce power consumption by the mobile station, the controller configured to:

hold data associated with a first polling message until a first scheduled RF wake-up of the mobile station;

send the data associated with the first polling message at substantially the same time as the first scheduled RF wake-up of the mobile station;

hold data associated with a second polling message until a second scheduled RF wake-up of the mobile station;

start a timer; and send data associated with a third polling message before a third scheduled RF wake-up when the timer reaches a predetermined value.

10. The controller of claim 9, wherein the data associated with the first and second polling messages is held in a queue in a radio link control (RLC) layer.

11. The controller of claim 9, the controller further configured to establish a TCP connection to a base station in the wireless communication network at substantially the same time as the first scheduled RF wake-up of the mobile station.

12. The controller of claim 9, wherein the first and second scheduled RF wake-ups of the mobile station are determined according to a schedule established by a service provider of the wireless communication network.

13. The controller of claim 9, the controller further configured to turn off a transceiver of the mobile station during an idle period between the first and second scheduled RF wake-ups of the mobile station.

14. The controller of claim 9, wherein the first and second polling messages are associated with an ActiveSync® Ping command.

15. The controller of claim 12, wherein the data associated with the first and second polling messages is held in a queue in a radio link control (RLC) layer.

16. The controller of claim 11, wherein the controller is configured to establish the TCP connection by placing the mobile station in a Cell_DCH state.

17. For use in a wireless communication network, a method for reducing power consumption in a mobile station, the method comprising:

holding data associated with a first polling message until a first scheduled RF wake-up of the mobile station;

sending the data associated with the first polling message at substantially the same time as the first scheduled RF wake-up of the mobile station;

holding data associated with a second polling message until a second scheduled RF wake-up of the mobile station;

starting a timer; and sending data associated with a third polling message before a third scheduled RF wake-up when the timer reaches a predetermined value.

18. The method of claim 17, wherein the data associated with the first and second polling messages is held in a queue in a radio link control (RLC) layer.

19. The method of claim 17, further comprising:

establishing a TCP connection to a base station in the wireless communication network at substantially the same time as the first scheduled RF wake-up of the mobile station.

20. The method of claim 17, wherein the first and second scheduled RF wake-ups of the mobile station are determined according to a schedule established by a service provider of the wireless communication network.

* * * * *